US007294216B2

(12) United States Patent
Whelan

(10) Patent No.: US 7,294,216 B2
(45) Date of Patent: Nov. 13, 2007

(54) LINER DRIVEN COMPONENT TRANSFER SYSTEMS AND METHODS

(75) Inventor: Dave Whelan, Littleton, CO (US)

(73) Assignee: Cobra Placement Systems LLC, Littleton, CO (US)

( * ) Notice: Subject to any disclaimer, the term of this patent is extended or adjusted under 35 U.S.C. 154(b) by 156 days.

(21) Appl. No.: 10/821,722

(22) Filed: Apr. 9, 2004

(65) Prior Publication Data

US 2005/0224166 A1 Oct. 13, 2005

(51) Int. Cl.
*B32B 37/00* (2006.01)

(52) U.S. Cl. ........................ 156/64; 156/247; 156/361; 156/542

(58) Field of Classification Search ........ 156/538–542, 156/247–249, 497, DIG. 24, DIG. 28, DIG. 33, 156/DIG. 37, DIG. 38, DIG. 42, DIG. 44, 156/DIG. 45, 64, 277, 285, 361, 384, 387
See application file for complete search history.

(56) References Cited

U.S. PATENT DOCUMENTS 4,255,220 A 3/1981 Kucheck et al.
4,479,839 A 10/1984 Tasma
4,822,442 A 4/1989 Ashcraft et al.
5,938,890 A 8/1999 Schlinkmann et al.
6,009,926 A * 1/2000 Vicktorius et al. .......... 156/556
6,368,446 B1 * 4/2002 McNestry .................. 156/247
6,558,490 B2 5/2003 Klein et al.
6,758,254 B2 * 7/2004 Moore et al. ............... 156/540

FOREIGN PATENT DOCUMENTS

DE 3911050 A * 10/1990

* cited by examiner

*Primary Examiner*—James Sells
(74) *Attorney, Agent, or Firm*—Townsend and Townsend and Crew LLP

(57) ABSTRACT

A component transfer device (100) according to the present invention includes a roller device (130) adapted for moving a liner (110) having a plurality of components (120) removably adhered thereto. The component transfer device includes a gripper (140) adapted for selectively gripping the liner, and a placement actuator (160) adapted for engaging a desired component (122) of the plurality of components. The placement actuator is further adapted for placing the desired component on a target device (176). The gripper and placement actuator are removably coupled with a coupler (150), with the coupler adapted for moving the placement actuator when the roller device moves the liner. In this manner, a controlled movement of the placement actuator and desired component is achieved.

40 Claims, 12 Drawing Sheets

LINER DRIVEN COMPONENT TRANSFER SYSTEMS AND METHODS

BACKGROUND OF THE INVENTION

The present invention relates generally to automated manufacturing or labeling equipment and methods, and more specifically, to systems and methods for removing components supplied on a liner and placing the components onto a target device such as a manufactured part.

Adhesive-backed components are used in a variety of industries. An adhesive-backed component may include different types of materials cut into different shapes to perform various functions, including paper labels with an adhesive between the label and liner, rubber or foam gaskets, and the like. The components are supplied on a roll of liner, typically made of paper or plastic, with a release coating so that the adhesive-backed component may be removed from the liner.

A variety of systems or methods exist for the removal of components from a liner, and the application of the component onto another device. For example, many manufacturing applications still utilize tedious hand placement of the adhesive-backed components onto target parts because of the expense of automation. While potentially cheaper than automated equipment, hand placement often lacks accuracy and fails to provide uniform placement from target to target.

Some existing systems, in an attempt to achieve placement accuracy, are very mechanically complex resulting in high cost and increased maintenance. Other existing systems have one or more shortcomings, including that they cannot place components quickly to facilitate production, are limited to only one function during the manufacturing process, tend to distort die-cut or soft components, lack a printing capability, cannot stack and place multiple components, cannot handle larger components (e.g., greater than a few to several inches) and the like. Improvements are desired.

BRIEF SUMMARY OF THE INVENTION

The present invention provides devices, systems and methods for removing components supplied on a liner and placing the components onto a target device, such as a manufactured part. Embodiments of the present invention are more adaptable to a variety of manufacturing needs and applications, are less mechanically complex and thus, more cost effective than other systems. Systems of the present invention can place a variety of components, including die-cut components, in a very accurate, reliable, easy to use and easy to maintain manner. Systems of the present invention offer ease of adaptation, can be multi-functional, and allow for fast, accurate component placement.

In one embodiment, a component transfer device according to the present invention includes a roller device adapted for moving a liner having a plurality of components removably adhered thereto. The component transfer device includes a gripper adapted for selectively gripping the liner, and a placement actuator adapted for engaging a desired component of the plurality of components. The placement actuator is further adapted for placing the desired component on a target device. The gripper and placement actuator are removably coupled with a coupler, with the coupler adapted for moving the placement actuator when the roller device moves the liner. In this manner, a controlled movement of the placement actuator and desired component is achieved.

In another embodiment, the gripper and placement actuators are fixedly coupled together for controlled movement thereof. In a particular aspect, the gripper and placement actuator move about a same linear distance when the roller device moves the liner. In some aspects, the placement actuator is adapted to engage the desired component while the desired component is adhered to the liner, and then retain the desired component while the component and liner are separated. In this manner, an accurate engagement of the desired component can be achieved.

In one aspect of the invention, the liner is gripped against a base having a peel edge over which the liner is moved. In one aspect, the peel edge is a fixed peel edge. In this aspect, the target device can be located close to the peel edge, in part since the peel edge need not be retracted in order to couple the component and target. The roller device may include a pinch roller for moving the liner, with the base disposed between the pinch roller and the gripper. In another aspect, a tension device is included to provide a back pressure generally resistive to the roller device moving the liner.

In one aspect of the present invention, the placement actuator includes a vacuum head for engaging the desired component. In one aspect, the vacuum head has a hole pattern with a same general shape as the desired component. In some aspects, the actuator rotates the desired component prior to placement on the target device.

In a particular aspect of the invention, the component transfer device includes a sensor adapted for sensing a position of the desired component on the liner. The sensor may also be adapted for sensing a position on the liner of a next component to be transferred. In one aspect, a gas jet is included, adapted for directing a gas towards the liner to bias the liner towards the base when the sensor is sensing the position of the desired component. In this manner, the liner is generally flattened while sensing occurs to increase the accuracy of the sensed location of the desired component.

In some aspects, the liner is an adhesive liner for removably adhering a plurality of components thereto, at least some of which are non-adhesive components in one aspect. Alternatively or in addition, at least some of the plurality of components are adhesive components removably adhered to an adhesive liner or non-adhesive release liner.

In some aspects, the component transfer device further includes a print head adapted to print on the desired component while the desired component is on the liner. This may occur, for example, while a prior component is being placed on a prior target device.

In some aspects, a controller is included for controlling some or all of the transfer device. For example, the controller may be coupled to the roller device for controlling the liner movement, to the gripper for controlling gripper operation, to a stroke actuator and/or to other components. The stroke actuator, in one aspect, is coupled to the placement actuator and is adapted for positioning the placement actuator relative to the target device. In one aspect, at least one stop is included, with the stop positioned to engage the placement actuator at a desired location relative to the target device.

In another embodiment of the present invention, a component transfer device includes a means for moving a liner over a peel edge, with the liner having a plurality of components removably adhered thereto. A placement device is included, adapted for engaging a first component of the plurality of components while the first component is adhered to the liner at a first location. The transfer device includes a gripper adapted for gripping the liner at a second location. In another embodiment, the gripper is adapted for gripping at the first location. The gripper and placement device are adapted for moving about a same linear distance when the liner is moved.

The present invention further provides exemplary methods of transferring components from a liner to a desired target. In one such embodiment, the method includes positioning the liner at a desired position, and engaging the liner with a gripper and with a placement actuator. The placement actuator engages a desired component that is removably adhered to a first portion of the liner. The method includes moving the liner so that the first portion passes over a peel edge. The gripper and the placement actuator move with the liner. The desired component is retained by the placement actuator and removed from the liner when the first portion passes over the peel edge. A relative movement is provided between the placement actuator retaining the desired component and the desired target. As a result, the desired component and the target device may be coupled. The relative movement may include movement of the desired component, movement of the target, or both.

In one aspect, the desired component remains substantially free of deformations when retained by the placement actuator compared to the desired component shape when adhered to the liner. This may be accomplished, for example, by applying a negative pressure or vacuum to the desired component using a plurality of vacuum holes in the placement actuator. In one aspect, the desired component is engaged by the placement actuator while it is still adhered to the liner. In this manner, the shape of the component does not change significantly when separated from the liner.

Other aspects of methods of the present invention include, without limitation, sensing the location of desired components on the liner, directing gas towards the liner to assist with the sensing, and printing on the desired component while the component is adhered to the liner. Some aspects include providing and controlling additional movements of the placement actuator to align the retained desired component and the desired target. Still other aspects include retaining a second desired target with the placement actuator, coupling the second desired target to the desired component while the desired component is adhered to the liner, and/or thereafter coupling the desired component to the desired target.

The summary provides only a general outline of some embodiments according to the present invention. Many other objects, features and advantages of the present invention will become more fully apparent from the following detailed description, the appended claims and the accompanying drawings.

DETAILED DESCRIPTION OF THE INVENTION

In accordance with the present invention, there are provided devices, systems, and methods for removing adhesive-backed or adhered components made from a wide array of materials from a liner, and accurately placing these components onto a target part or device. The devices, systems, and methods allow much larger adhesive-backed components to be placed with the same precise accuracy as smaller components in an automated or semi-automated process. It allows for quick and easy loading and unloading of the liners containing the adhesive-backed components, and allows great versatility and adaptability of the component placement process in a wide range of industrial applications.

Systems of the present invention may operate as a stand-alone workstation, or may be integrated into an automated line. Some of the systems may be used as a platform for adaptation into nearly any industry for a wide variety of applications. The systems may, for example, be mounted on a heavy base made of metal or another appropriate material and may have a supply reel to feed the liners of adhesive-backed components into the apparatus.

Figure 1A:
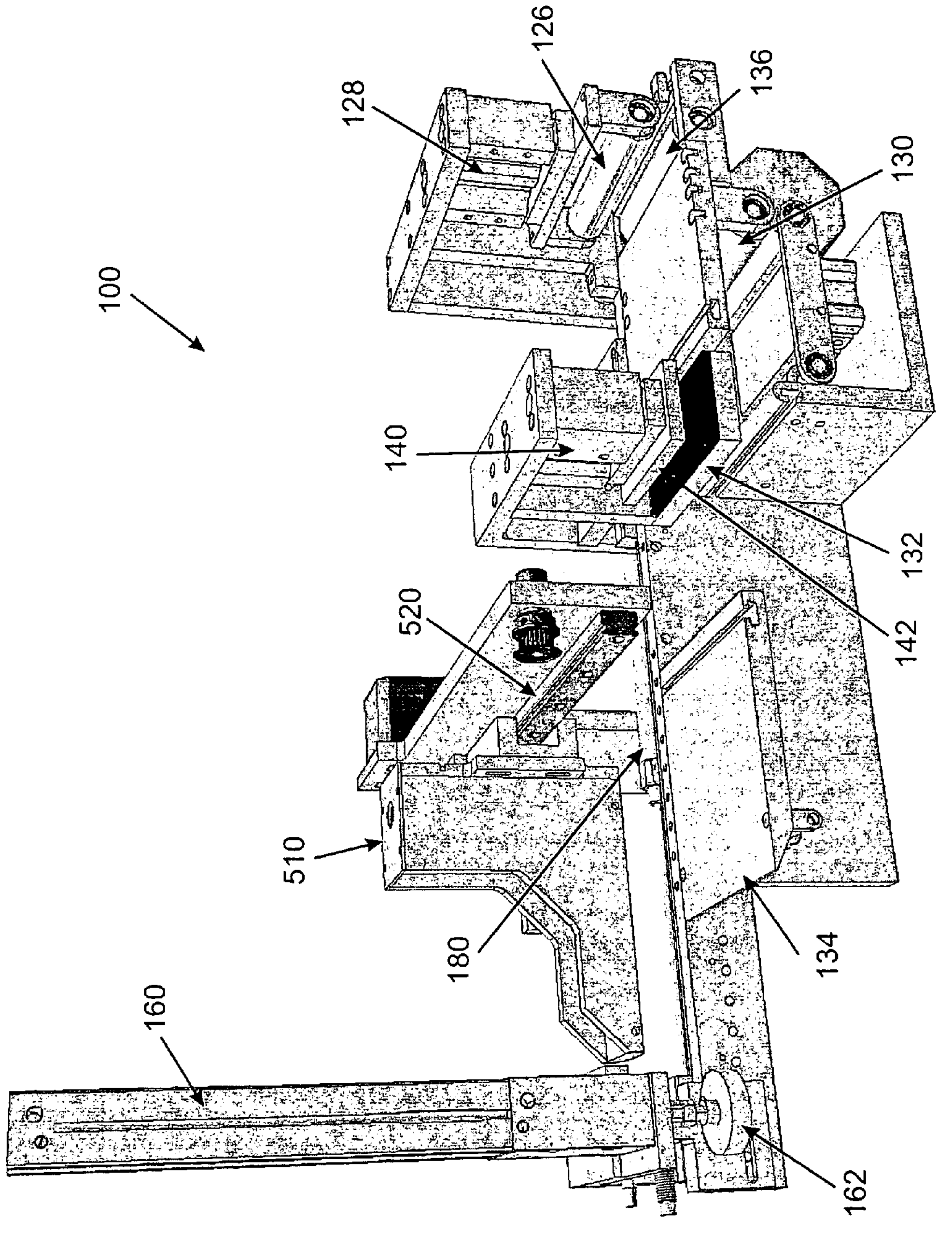
FIGS. 1A and 1B are overall views of a component transfer device according to an embodiment of the present invention.
Figure 1B:
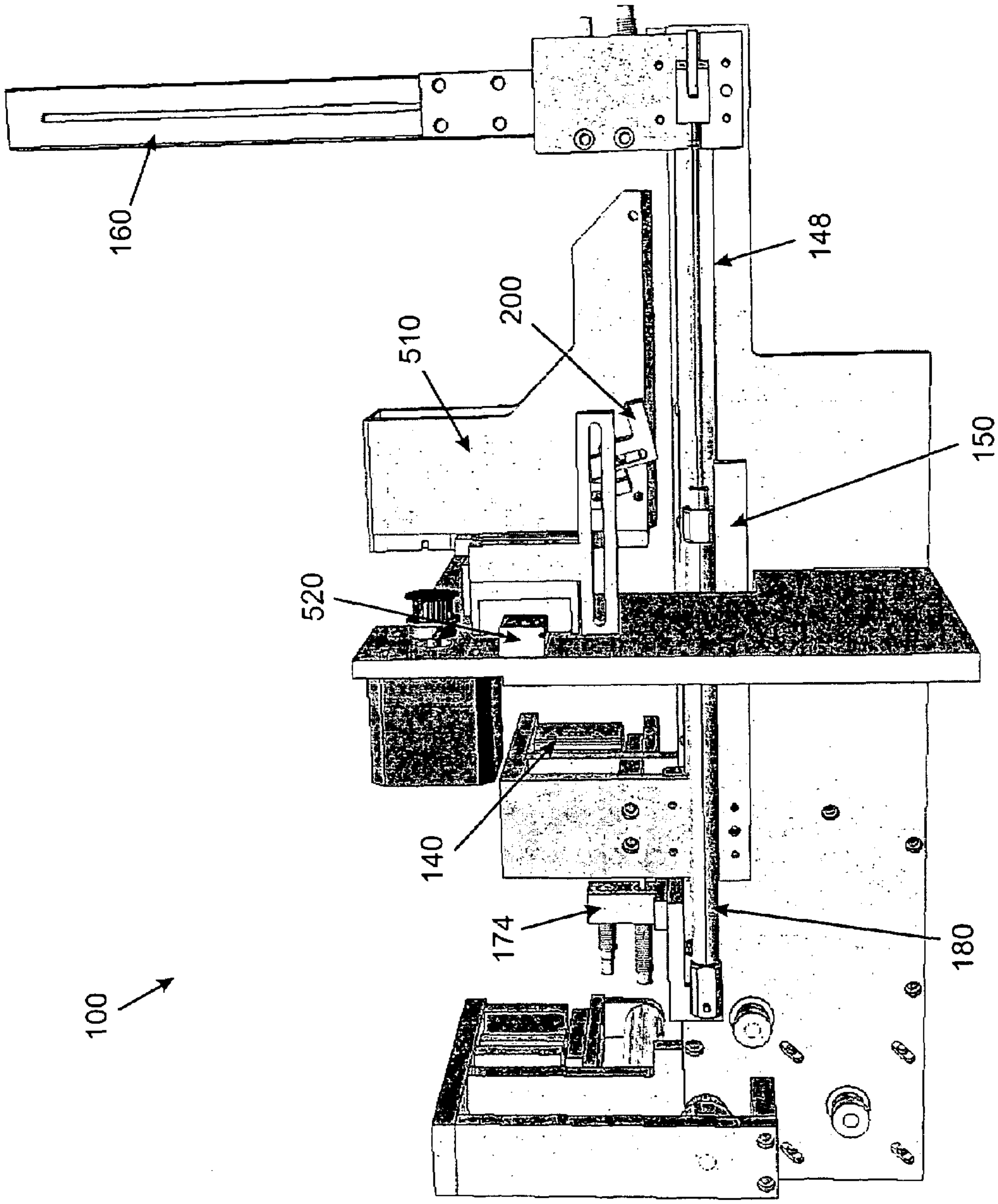
Figure 2:
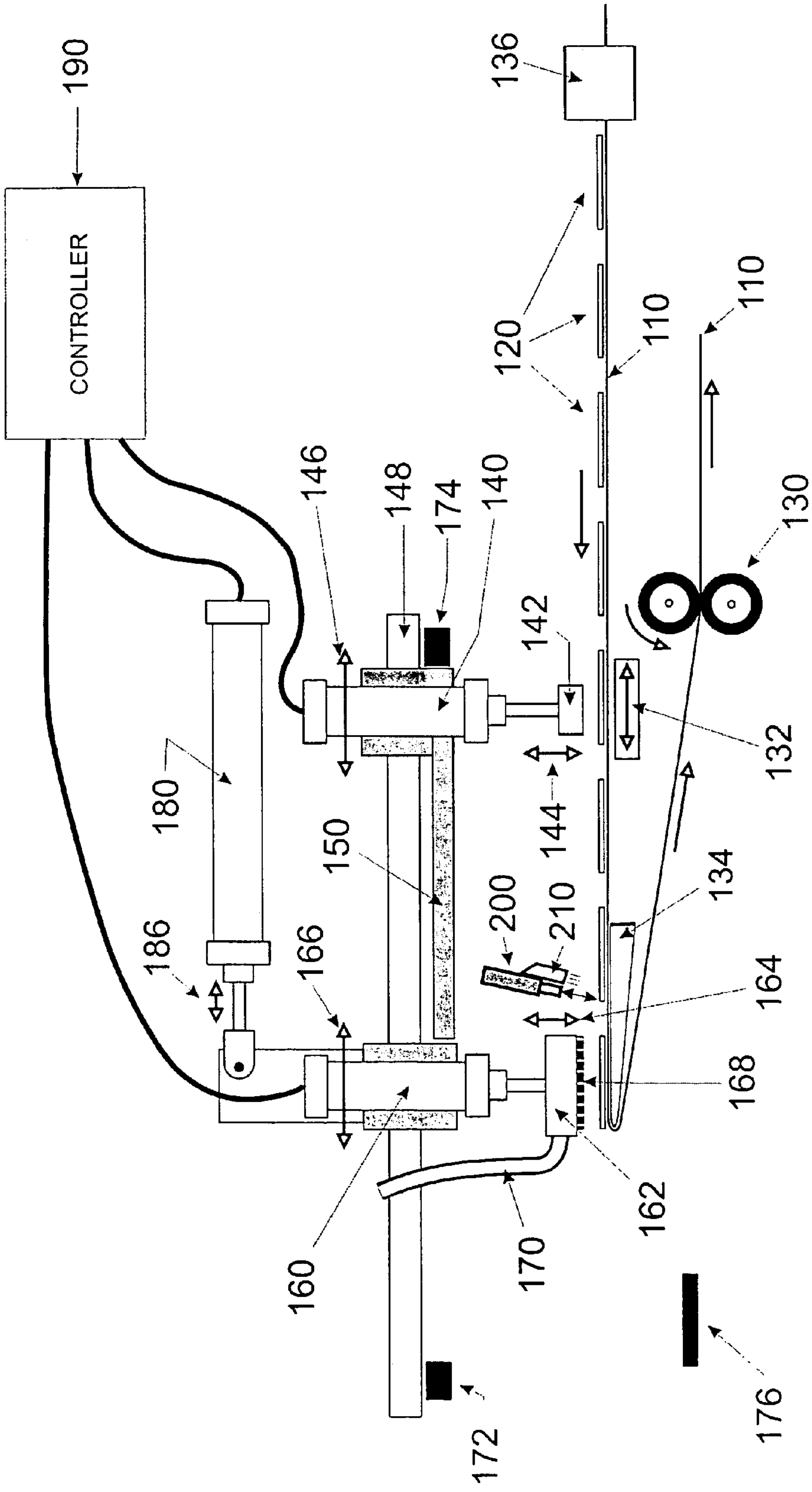
FIG. 2 is a simplified side view schematic of a component transfer system according to an embodiment of the present invention.

FIGS. 1A-1B depict simplified overall views of a component transfer device 100 according to an embodiment of the present invention. A simplified side schematic of device 100 is depicted in FIG. 2, which further shows device 100 schematically coupled to a controller 190. With reference to FIGS. 1A, 1B, and 2, component transfer device 100 is adapted to receive a liner 110 having a plurality of components 120 spaced apart thereon. Liner 110 may comprise an adhesive liner, with components 120 removably adhered to the adhesive. Alternatively or in addition, liner 110 is a non-adhesive release liner 110 with components 120 having an adhesive side or portion that is used to removably adhere components 120 to liner 110. Liner 110 may comprise paper, plastic, metal, or the like.

Components 120 may comprise a wide range of components for use in a large number of industries. For example, components 120 may comprise a series of labels to be affixed to target devices, including product labels, parts number labels, mailing labels, or the like. These labels may, for example, be affixed to packaging or envelopes, directly to a product, or to product containers. Similarly, components 120 may be a wide range of die-cut components for use with any number of products. For example, components 120 may include templates or portions of cell phones, gaskets, lens protect films, foil shields, rubber or foam feet, or the like. Components 120 can be made from a wide range of materials, including metals, plastics, rubbers, ceramics, nylons, paper, and the like. In one embodiment, components 120 are spaced generally uniformly along liner 110 and are removed for placement on target devices or products 176 by systems and in accordance with methods of the present invention.

A supply reel of adhesive-backed components 120 on liner 110 is fed into apparatus 100 between metal guides, around a peel edge 134, and through one or more rollers. In this embodiment, the loading process takes between about ten (10) seconds and about fifteen (15) seconds, although different loading times also may occur. In one embodiment, the loading process involves opening or removing a side cover on the apparatus 100 (not shown). Alternatively, the exterior side view is similar or the same as that shown in FIG. 1, with access for loading liner 110 readily available. In a particular embodiment, each of the components (actuators, rollers, and the like described below) in contact with liner 110 are air driven. In this manner, by depressurizing the various components in contact with liner 110, device 100 is easily reloaded with a new liner 110 of components 120.

Liner 110 is generally drawn along a surface or base 132, and around or over peel edge 134 by a means for moving liner 110. In one embodiment, the means for moving liner 110 include roller devices 130. Roller devices 130 may comprise two or more rollers rotating in opposite directions for drawing liner 110 therebetween. In one embodiment, roller device 130 includes a drive roller and a pinch roller. The pinch roller presses against the liner drive roller with the liner in between the two to provide the traction needed to pull liner 110 through apparatus 100 as the liner drive roller turns. In one embodiment, a controller 190 operates to rotate device roller 130.

In one embodiment, controller 190 includes a housing control case, which may be made from a plastic, a metal, or other appropriate material, and may be based on off-the-shelf controls hardware. In one embodiment, a four axis controller is used for operation of component transfer devices of the present invention. Controller 190 may further include a processor and a computer memory for storage and operation of one or more computer programs for device 100 operation. The software may be modified for various applications, different sized components 120 and targets 176, and the like.

In some embodiments, device 100 includes means for providing back pressure that is generally resistive to the movement of liner 110 by rollers 130. The means for providing back pressure may include, for example, a friction device, tension coils, tension rollers, or the like. In one embodiment, liner 110 is fed between tension rollers 136 for providing friction or back pressure against liner 110 movement by rollers 130. Tension rollers 136 may be coupled to a clutch mechanism, for providing a desired or appropriate amount of drag on liner 110 as it passes between rollers 136. In another embodiment, the means for providing back pressure comprises a tension roller 136 and a pinch roller 126. Pinch roller 126 is biased against tension roller 136 by an actuator 128, which may be an air-activated actuator. In this manner, back pressure or drag is imparted on liner 110, to partly resist movement of liner 110 produced by rollers 130.

As shown in FIGS. 1A-2, component transfer device 100 includes a gripper 140 having a gripper head 142 adapted to move as shown by arrows 144. Gripper head 142 may comprise a rubber, a metal, a plastic, a ceramic, or the like for contacting liner 110 and/or component 120. Device 100 further includes a placement actuator 160, that in one embodiment is spaced apart from gripper 140. Placement actuator 160 includes a vacuum head 162 adapted to move as shown by arrows 164. In one embodiment vacuum head 162 has a plurality of holes 168 that are coupled to an air or vacuum source by a line or hose 170. In this manner, a positive or negative pressure may be applied to holes 168. As best shown in FIG. 2, both gripper 140 and placement actuator 160 are adapted to slide or otherwise move along a rail 148. Further, a coupler 150 is mounted between gripper 140 and placement actuator 160. Coupler 150 may comprise a rigid rod, bar, or similar structure. In one embodiment, coupler 150 is fixably coupled to gripper 140, and removably coupled to placement actuator 160. In this manner, the movement of gripper 140 (as shown by arrow 146) and placement actuator 160 (as shown by arrow 166) may be synchronized. More specifically, a linear movement of gripper 140 to the left in FIG. 2 will cause a same or similar linear movement of placement actuator 160 to the left in FIG. 2.

Device 100 further includes, in one embodiment, a stroke actuator 180 for providing additional movements to placement actuator 160 as depicted by arrows 186. In one embodiment, stroke actuator 180, placement actuator 160 and/or gripper 140 include high quality pneumatic cylinders with recirculating ball bearings on the shafts. In one embodiment, stroke actuator 180, placement actuator 160, and/or gripper 140 comprise pneumatically-powered actuators, motor-operated actuators, motors, and/or the like. In one embodiment, stroke actuator 180 is adapted to extend placement actuator 160 sufficiently beyond peel edge 134 so that vacuum head 162 may be translated to engage target device 176. In this manner, placement actuator 160 is decoupled from coupler 150. In one embodiment, a hard stop 172 is provided at the appropriate location so that when stroke actuator 180 translates placement actuator 160 until it contacts hard stop 172, vacuum head 162 is disposed in proper relationship with respect to target 176. Hard stop 172 may be positioned along rail 148, or coupled to some other structure in device 100.

In one embodiment, device 100 includes a sensor 200 for sensing a location of one or more components 120 on liner 110. In one embodiment, an air jet 210 is provided in proximity to sensor 200. Air jet 210 is coupled to an air source, a compressor, or the like. Air jet 210 is adapted for directing air or some other gas towards liner 110, and more specifically, towards a component 120 whose position is to be sensed by sensor 200. In this manner, liner 110 is biased or pressed against peel edge 134 or against base 132 so that sensor 200 can more accurately sense a location of component 120 to be engaged by placement actuator 160. Sensor 200 and air jet 210 may be positioned in alternative locations than those depicted schematically in FIG. 2, within the scope of the present invention. Additional features and characteristics of device 100 and controller 190 will be described in conjunction with later figures, including FIGS. 3A-3F.

Figure 3A:
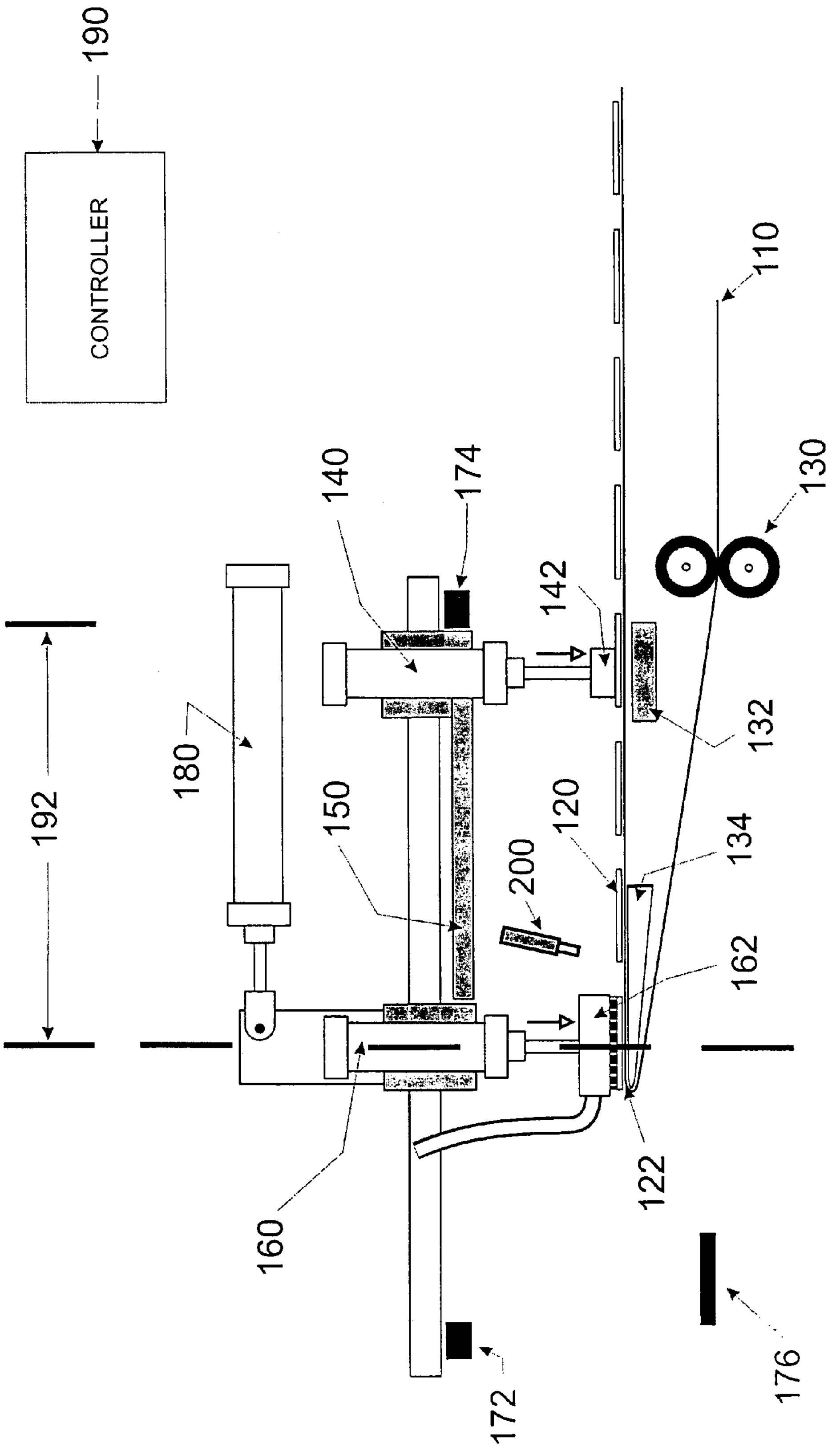
FIGS. 3A-3F depict various stages of the operation of the system shown in FIG. 2, according to an embodiment of the present invention.

Turning now to FIGS. 3A-3F, a method of transferring a component according to the present invention will be described. In one embodiment, stroke actuator 180 retracts placement actuator 160, which engages coupler 150 as shown in FIG. 3A. Continued movement of stroke actuator 180 causes gripper 140 to contact hard stop 174. In one embodiment, placement actuator 160 is a known or measurable distance 192 from hard stop 174. Gripper head 142 is moved towards liner 110 to bias or press liner 110 towards base 132 or a gripper back plate. Further, vacuum head 162 is moved to bias or press a desired component 122 against base 132 or peel edge 134. A vacuum may be applied when vacuum head 162 contacts component 122, to further couple vacuum head 162 to component 122 on liner 110. Once gripper head 142 and vacuum head 162 are in contact with liner 110, stroke actuator 180 is de-energized.

Figure 3B:
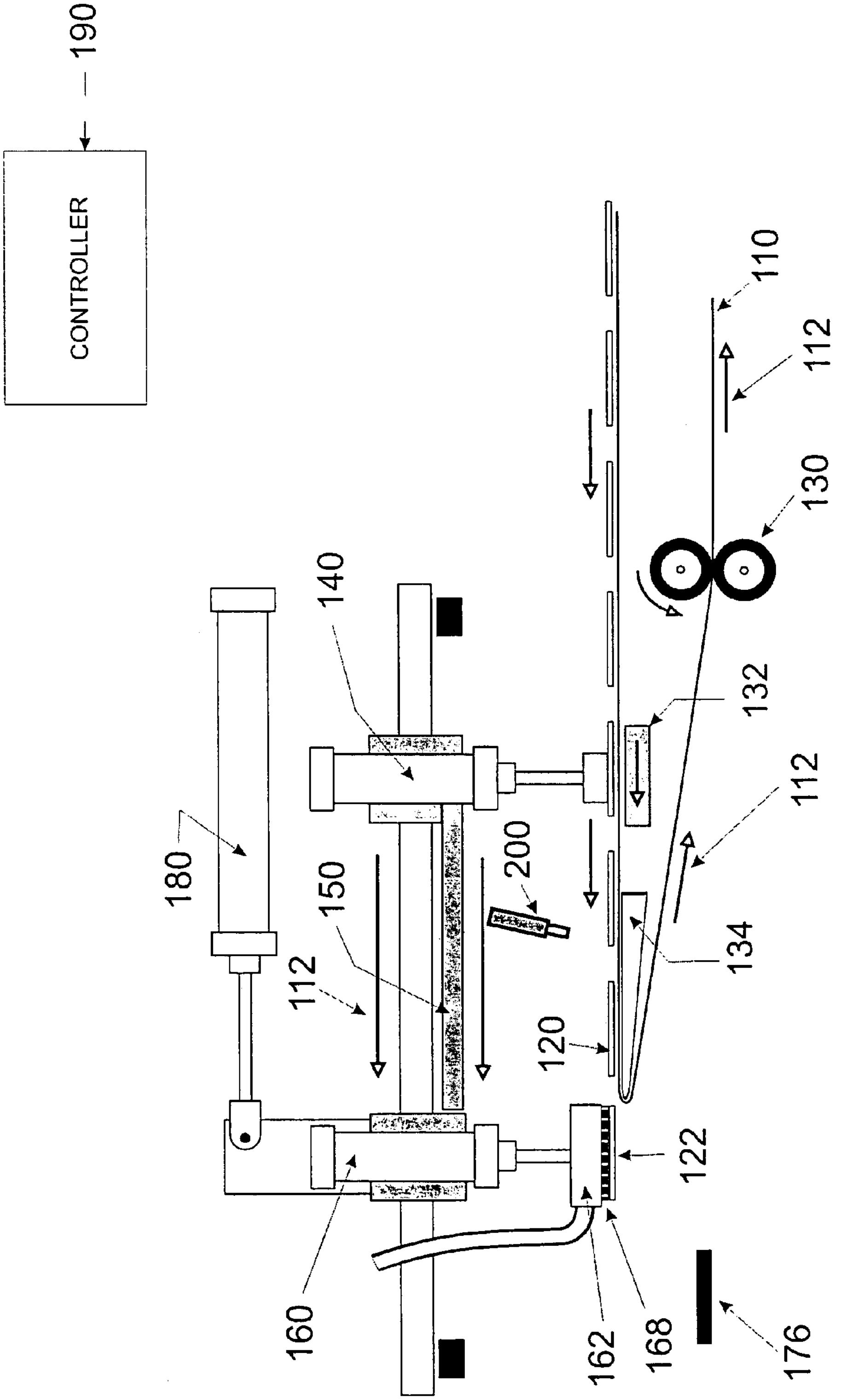

After gripper head 142 and vacuum head 162 have engaged liner 110 (or components 120, 122 thereon), liner 110 is drawn through roller device 130 to cause a translation of both gripper 140 and placement actuator 160. As the portion of liner 110 having desired component 122 thereon passes over peel edge 134, component 122 is separated from liner 110. A vacuum has been maintained with vacuum head 162, such that desired component 122 is retained by vacuum head 162 as actuator 160 moves to the left as shown in FIG. 3B. By maintaining the vacuum, component 122 will not move in relation to head 162, and thus the end placement of component 122 onto target device 176 can be accurate. By coupling vacuum head 162 to component 122 while component 122 remains on liner 110, the present system 100 is more accurate than a "blow and tamp" technique that blows the component towards a vacuum head as the component is removed from the liner.

Further, the system provides for accurate, repeatable placement of components 122. Such a system is considerably more accurate than a "peel and wipe" technique, which passes a target device past a peel edge as a component is removed from a liner so that the component sticks directly to the target device.

In some embodiments, base 132 also moves to the left in FIG. 3B. In alternative embodiments, base 132 is a fixed base, and liner 110 is drawn over base 132 with gripper head 142 biasing liner 110 into base 132. Further, in one embodiment, peel edge 134 comprises a portion of base 132.

As best shown in FIG. 3B, the translation of liner 110 to the right as shown by arrow 112 causes the leftward movement of gripper 140 and actuator 160. Coupler 150 operates to translate actuator 160 a like or same linear distance as gripper 140. In this manner, liner 110 is not compressed, bunched or otherwise deformed by the translation of actuator 160 and gripper 140. Further, the potential for slippage of liner 110 is reduced or eliminated, resulting in the accurate retention and placement of component 122. As a result, desired component 122 engaged by vacuum head 162 is not deformed. The general shape of desired component 122 remains substantially the same after removal from liner 110 in comparison to its shape while adhered to liner 110. Further, liner 110, gripper 140 and actuator 160 are translated at about the same speed, experience about the same acceleration and deceleration, and translate about the same linear distance.

Figure 3C:
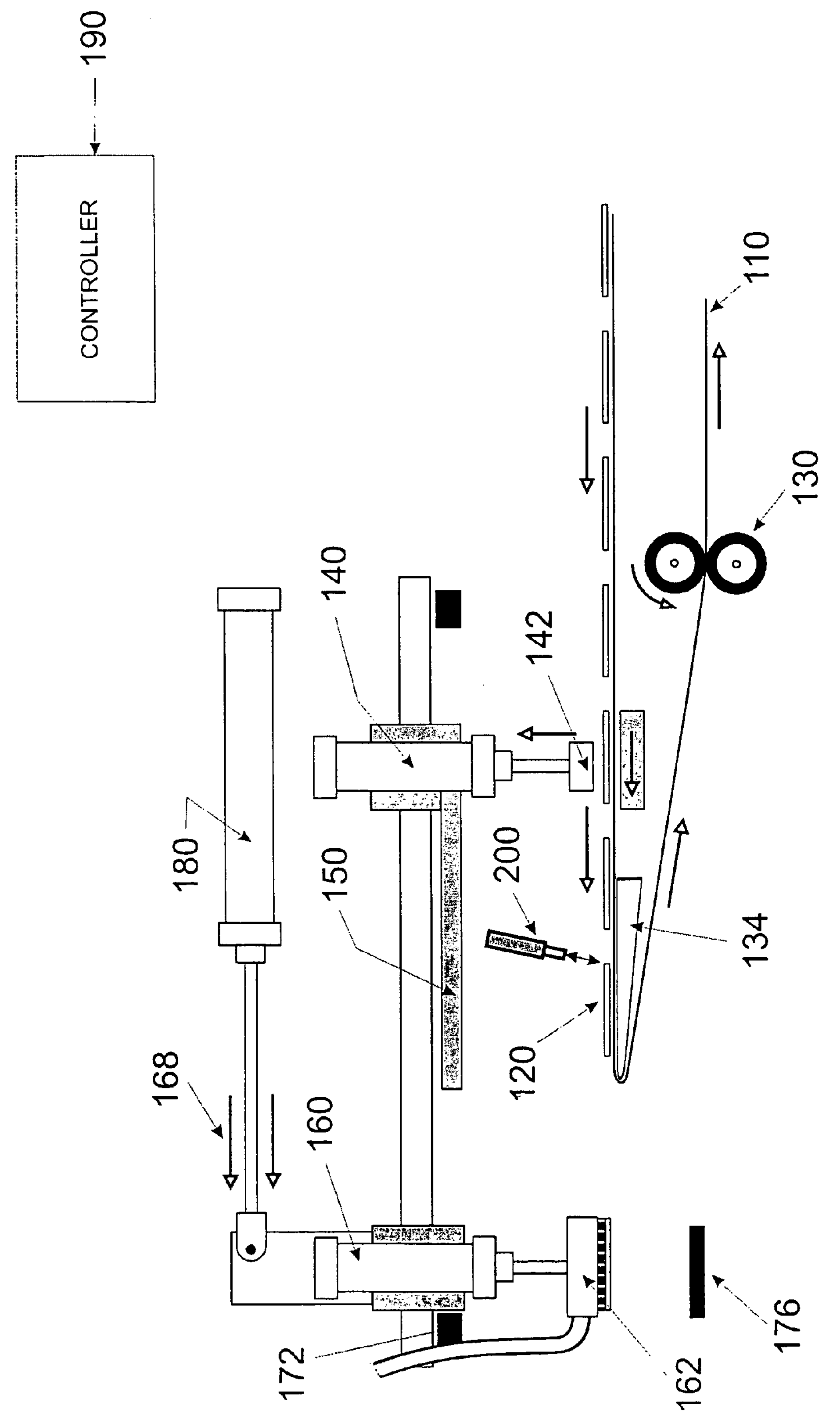

In one embodiment, liner 110 is drawn or translated until desired component 122 clears peel edge 134 and separates from liner 110. As best shown in FIG. 3C, stroke actuator 180 operates to continue movement of placement actuator 160 towards the left until it engages hard stop 172. Hard stop 172 may comprise a variety of materials and have a variety of shapes other than that depicted in the Figures. Further, hard stop 172 may be a movable hard stop so that it can be adjusted relative to the desired target 176. Hard stop 172 also may be adjusted to accommodate larger or smaller components 120 to be transferred and/or larger or smaller targets 176. In one embodiment, hard stop 172 includes a shock absorber, such as a fluid-filled cylinder, an air shock, or the like. FIG. 3C further depicts the retraction of gripper head 142 into gripper 140, thereby releasing gripper head 142 from liner 110.

During this translation of component 120, sensor 200 is operating to sense a next component of the desired components 120 to be engaged by placement actuator 160 upon its return. Sensor 200 may comprise an optical sensor (retroreflective, through-beam, or the like), a mechanical sensor, or the like. In one embodiment, sensor 200 operates to sense a leading edge, a trailing edge, or a specific portion or tag on the next component 120. Once the next component 120 is sensed and correctly positioned, in one embodiment liner 110 movement is stopped. Alternatively, roller 130 moves liner 110 a preprogrammed distance to position component 120 under where vacuum head 162 will return. In this manner, an accurate location of the next component 120 to be transferred is known. In another embodiment, controller 190 operates to compare the distance 192 with the physical length of gripper 140, coupler 150, and placement actuator 160 so that the return of placement actuator 160 will result in vacuum head 162 engaging the next component 120.

One advantage of the use of sensor 200 is to accommodate a liner 110 having irregularly-spaced components 120. In most cases, even a liner that was intended to have regularly-spaced components may in reality have irregular spacing. Components intended to be regularly spaced may, in one embodiment, have spacing which varies by about 0.015 inches to about 0.020 inches. Further, in some embodiments, liner 110 may be missing one or more components 120. As a result, liner 110 can be drawn through rollers 130 a desired distance to quickly position the next component 120.

Figure 3D:
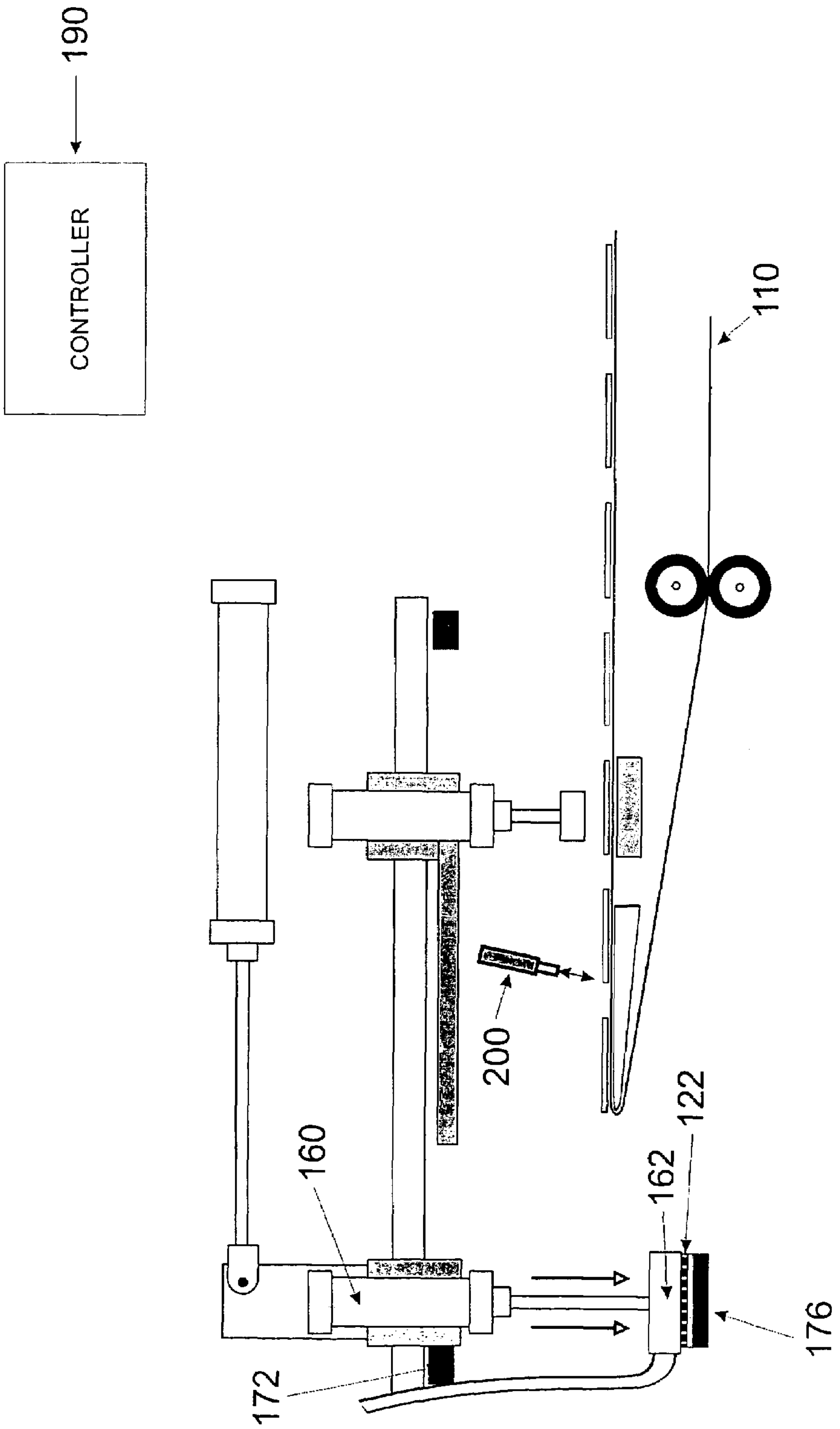

As shown in FIG. 3D, placement actuator 160 operates to place a desired component 122 on target device 176. Target device 176 can be manually placed into the receiving position or moved into position by other automation. Target device 176, in general, is held in place by some type of fixture as it awaits placement of desired component 122.

The coupling of component 122 and target device 176 occurs, for example, by providing relative movement between vacuum head 162 and desired target 176. As shown in FIG. 3D, in one embodiment the relative motion is provided solely by vacuum head 162 of placement actuator 160. In alternative embodiments, target device 176 is moved towards vacuum head 162, with vacuum head 162 remaining stationary. Alternatively, both target 176 and vacuum head 162 may provide some portion of the relative movement toward each other to couple desired component 122 and target device 176. In one embodiment, a vacuum is applied to vacuum head 162 during the movements depicted in FIGS. 3B, 3C, and 3D. Once desired component 122 engages target device 176, in one embodiment, the vacuum is equalized or removed from vacuum head 162. The coupling of desired component 122 and target device 176 occurs as a result of the adhesive nature of one or both. In some embodiments, the air pressure in vacuum head 162 is reversed, accomplishing a "blow-off" or "blow-down" of desired component 122 onto target 176.

Figure 3E:
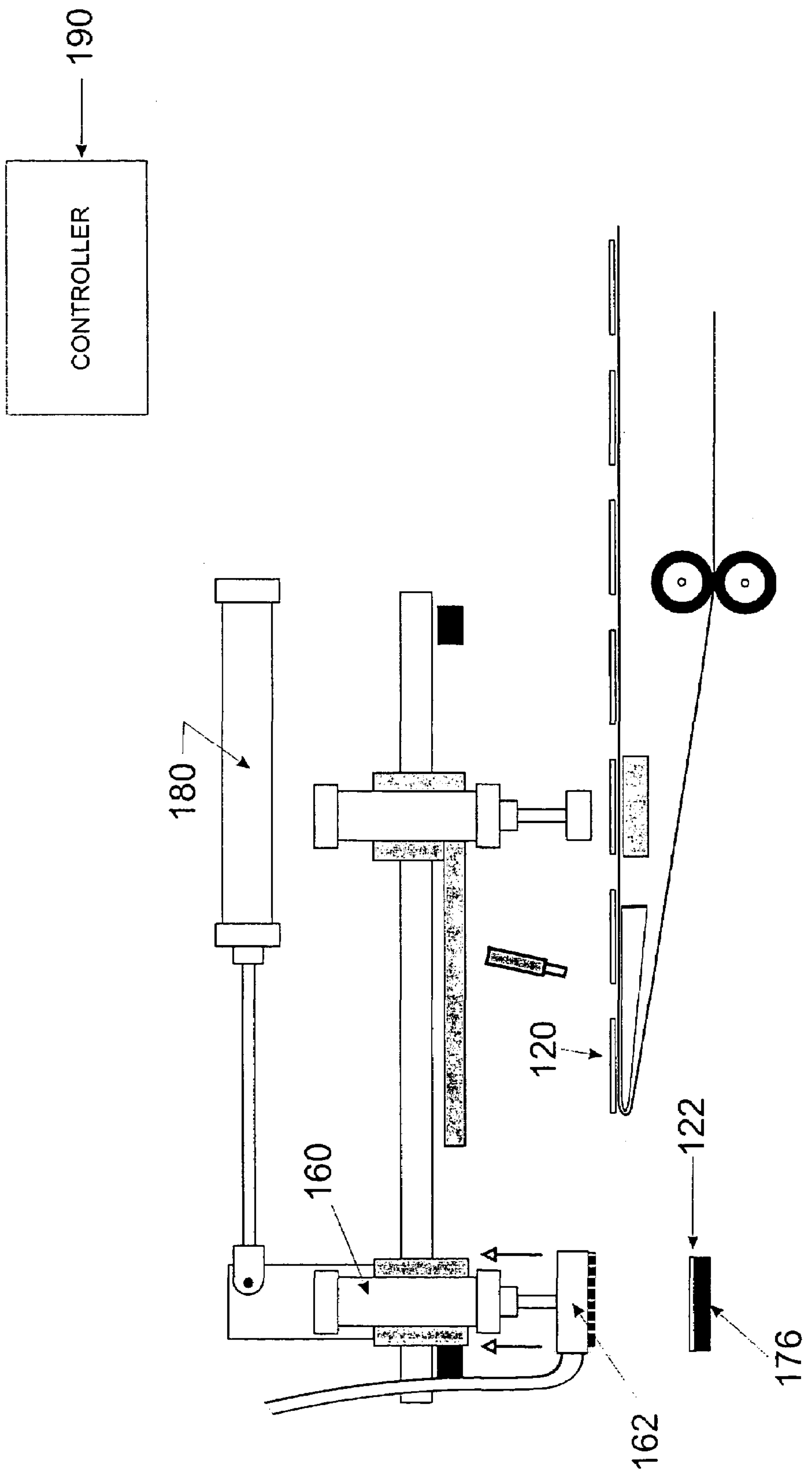
Figure 3F:
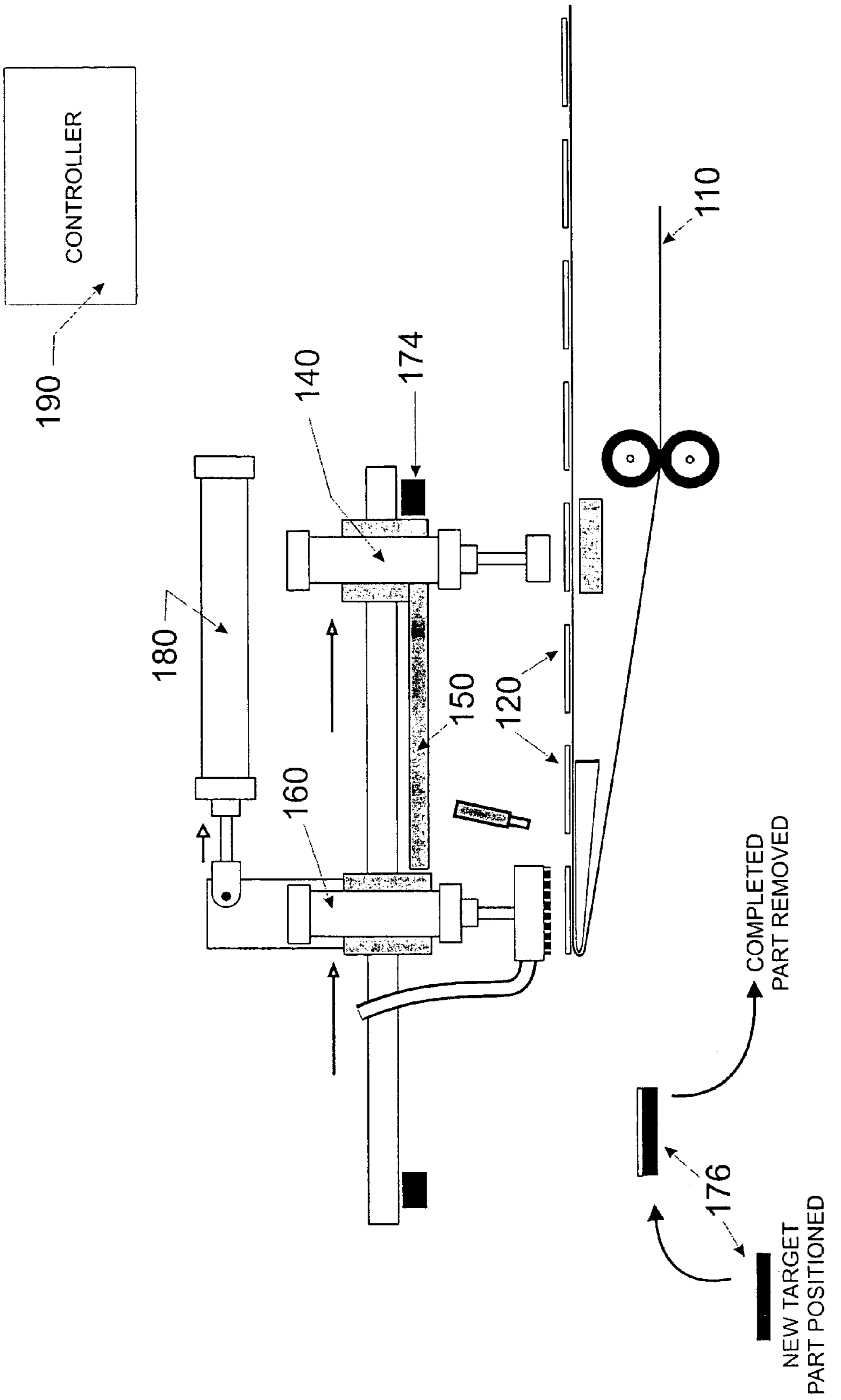

Once desired component 122 and target device 176 have been coupled, vacuum head 162 is withdrawn by placement actuator 160 as best shown in FIG. 3E. In one embodiment, liner 110 has correctly positioned the next desired component 122. As shown in FIG. 3F, stroke actuator 180 operates to move placement actuator 160 to the right in FIG. 3F until it engages coupler 150. Stroke actuator 180 may continue movement of placement actuator 160 and, as a result, move coupler 150 and gripper 140. Stroke actuator 180 may be set to translate placement actuator 160 a desired distance, or until gripper 140 contacts hard stop 174. In one embodiment, hard stop 174 includes a shock absorber, such as a fluid-filled cylinder, an air shock, or the like. In one embodiment, device 100 includes one or more limit switches coupled to stroke actuator 180 to sense actuator 180 position, distance of travel, and the like. The limit switches (not shown) are coupled to controller 190 for verification of actuator 180 position before engaging another component 120. In other embodiments, placement actuator 160 and/or gripper 140 include limit switches.

Target device 176 is removed and a new target device is positioned to receive the next desired component 120 (FIG. 3F). Target device 176 may, for example, continue with automated production or assembly processes, including receiving additional parts or components 120. Target device 176 also may be a completed product. The process described in conjunction with FIGS. 3A-3F may now be repeated any desired number of times to couple other components 120 with other target devices 176.

Figure 4:
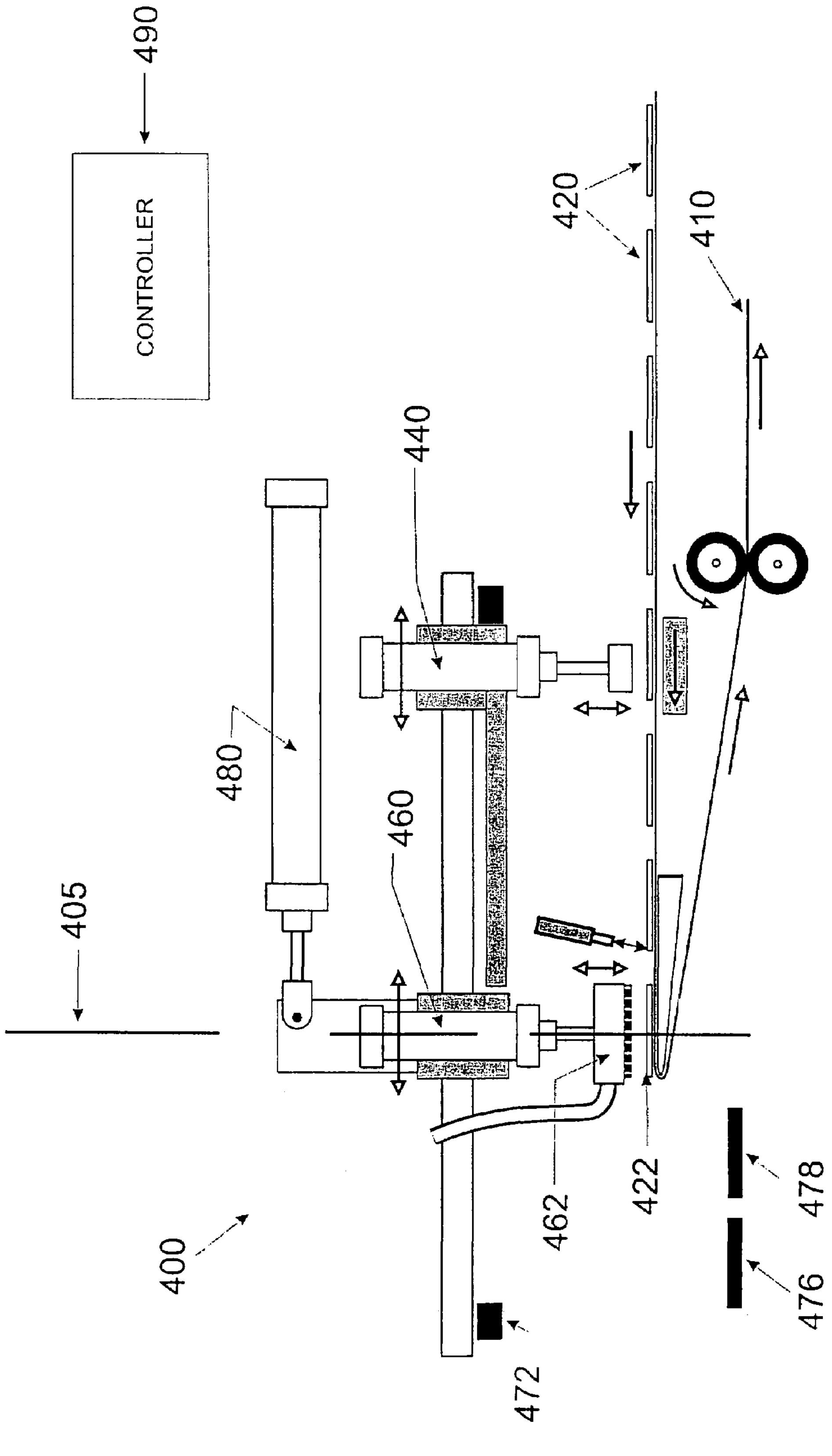
FIG. 4 depicts a simplified side view schematic of an alternative embodiment of the component transfer system according to the present invention.

FIG. 4 depicts an alternative embodiment of a system 400 according to the present invention. In one embodiment, the components and characteristics of system 400 are similar to those described in conjunction with earlier figures, and thus have similar reference numbers. However, system 400 further provides for mating of a desired component 422 to multiple target devices. In one embodiment, a placement actuator 460 operates to engage a target device 478 by activating a vacuum head 462. Target device 478 is then positioned over desired component 422 and mated thereto by activating a placement actuator 460 to move target device 478 towards desired component 422. In this embodiment, the upper surface of desired component 422 and/or the lower surface of target device 478 may have an adhesive affixed thereto or may comprise an adhesive. The mated target device 478 and desired component 422 are then removed from a liner 410 similar to that described in conjunction with FIGS. 3A-3B. A target device 476 is then engaged by providing relative movement between target device 476 and the mated combination of target device 478 and desired component 422. In this embodiment, desired component 422 is mated between target devices 478 and 476.

Further, in one embodiment, an additional hard stop is provided so that placement actuator 460 is correctly positioned, first above target device 478 and then above target device 476. Alternatively, a single movable hard stop 472 is used and translated between the two desired positions as shown in FIG. 4. Target devices 476, 478 and component 422 may be coupled in a different order within the scope of the present invention. For example, desired component 422 may be first removed from liner 410 as described in conjunction with FIGS. 3A-3B, after which it is coupled to target device 478. In this case, the vacuum in vacuum head 462 is maintained to lift both desired component 422 and target device 478. The coupled component 422 and device 478 are then repositioned above target device 476 and mated by providing relative movement between vacuum head 462 and target device 476. In this example, target device 476 and/or 478 may have an adhesive portion. In this manner, system 400 is used to couple two, three or more components together.

In another embodiment for use with FIGS. 1, 2, 3A-3F and/or FIG. 4, placement actuator 460 may be adapted to rotate desired component 422 about an axis 405. The rotation may occur when placement actuator 460 has engaged desired component 422 after removal from liner 410. Alternatively, the rotation may occur after target device 478 and desired component 422 have been mated, but before mating to target device 476. In still another embodiment, placement actuator 460 is used to rotate the fully mated target devices 476, 478 and component 422 by maintaining the vacuum with vacuum head 462 and rotating either actuator 460 and/or vacuum head 464 through a desired range of rotation. In one embodiment, a ninety degree (90°) rotation is provided, although other ranges of rotation also fall within the scope of the present invention.

Figure 5:
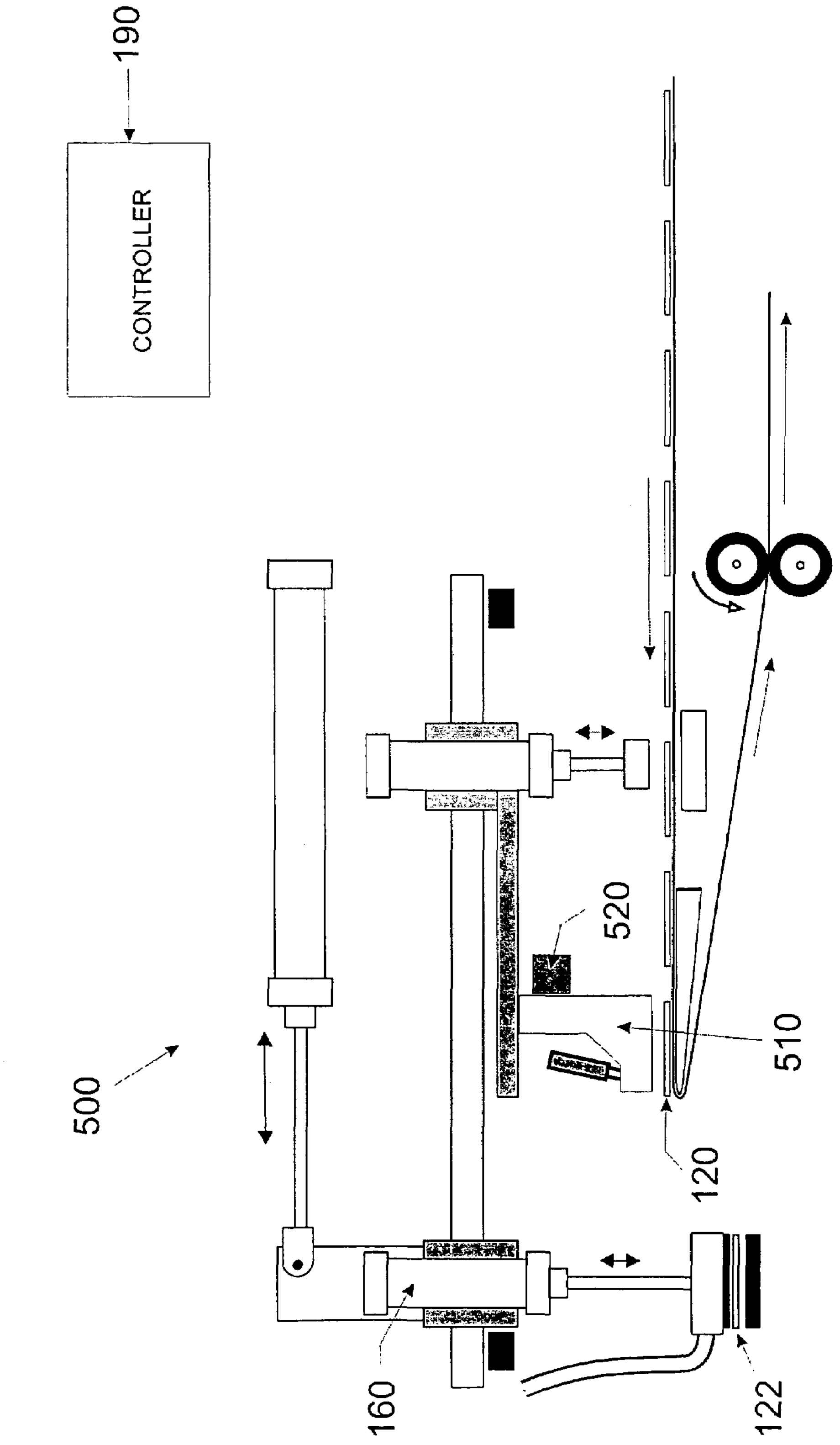
FIG. 5 depicts a simplified side view schematic of another component transfer system according to the present invention.

Turning now to FIG. 5, an alternative system 500 according to the present invention will be described. Again, system 500 may include many of the same components and features as described in conjunction with earlier figures. In this embodiment, a print head 510 is included for printing alpha numeric characters, images, bar codes, or the like onto one or more components 120. In one embodiment, print head 510 operates to print on components 120 while components await engagement with placement actuator 160. In a particular embodiment, the printing occurs on a next component to be placed, such as that shown in FIG. 5. In one embodiment, as shown in FIG. 5 and also depicted in FIG. 1, print head 510 translates along a guide rail 520. In this manner, print head 510 may be positioned over liner 110 for printing on component 120 while placement actuator 160 is coupling desired component 122 to a target device. Print head 510 is translated or otherwise moved so that placement actuator 160 can return to the position depicted in FIG. 3A for engagement with the next desired component 120. As can best be seen in FIGS. 1A and 1B, in one embodiment print head 510 is adapted to accommodate inkjet printer cartridges. In other embodiments, print head 510 comprises a thermal transfer device, a laser printer, or the like. In this manner, a unique printing ability is provided for components 120 just prior to their coupling with a target device.

Figure 6:
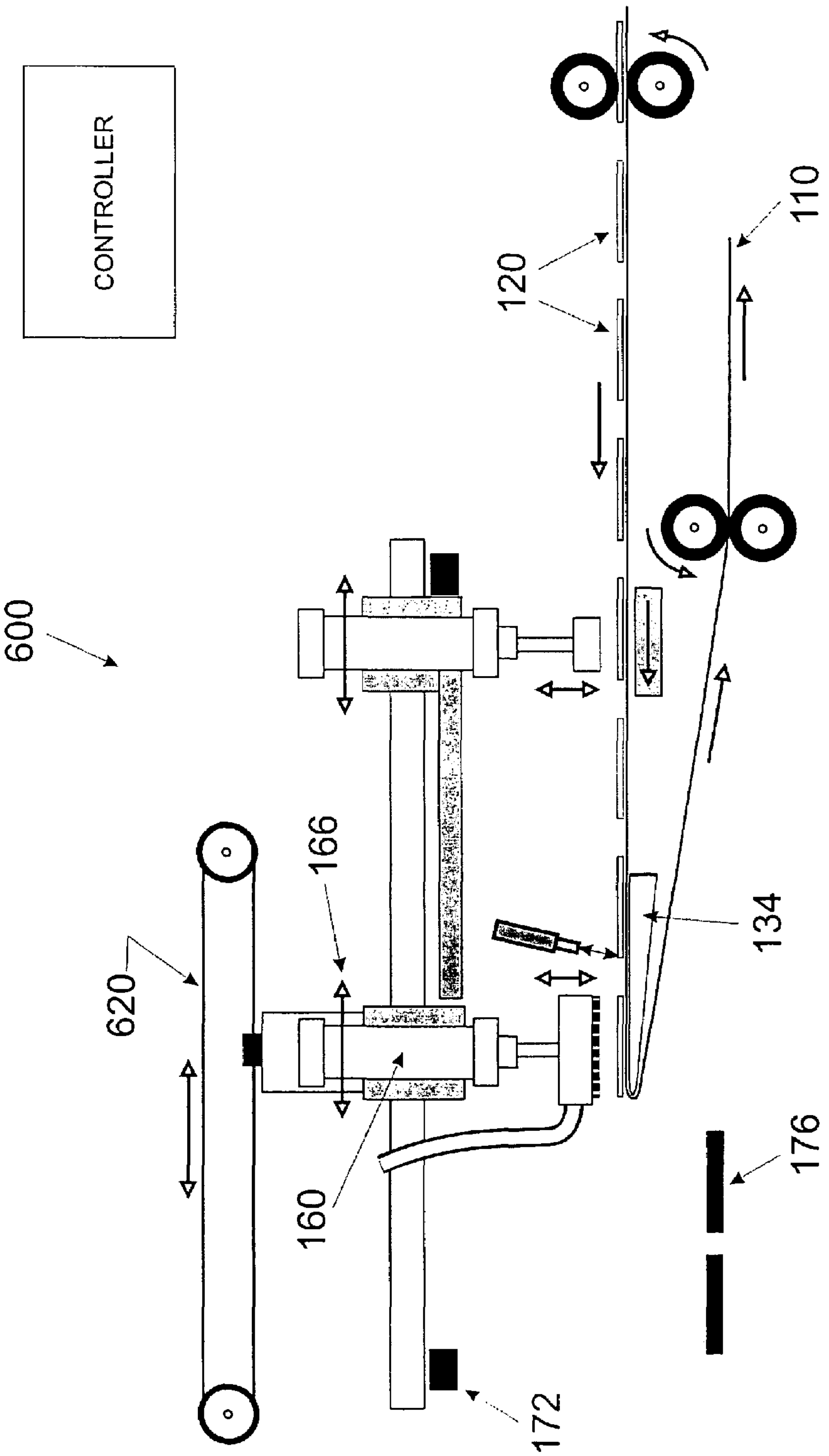
FIG. 6 depicts a simplified side view schematic of an alternative embodiment of a component transfer system according to the present invention.

An alternative embodiment of a component transfer device 600 according to the present invention is depicted in FIG. 6. In this embodiment, stroke actuator 180 is replaced with a belt drive 620. Many of the other components of device 600 are similar to or the same as those described in conjunction with prior Figures. Belt drive 620 may comprise a metal, rubber, plastic, or other material, and may rotate around two or more pulleys, rollers, pegs or the like. Belt drive 620 operates to translate placement actuator 160 above a desired target device 176, or above a series of target devices. In particular, belt drive 620 is configured to translate placement actuator 160 a desired amount or amounts to the left and right in FIG. 6, as shown by arrow 166. In one embodiment, a DC servo is included with belt drive 620. The DC servo (not shown in FIG. 6) is designed to de-energize with substantially no drag on belt drive 620, thus providing accurate positioning of placement actuator 160. As a result, the placement actuator 160 may stopped incrementally by belt drive 620. In this embodiment, hard stop 172 may be used as a safety stop, to prevent actuator 160 from extending too far from peel edge 134.

One particular use of this embodiment would involve the transfer of components 120 to a series of target devices 176 which are disposed in a stationary, linear-shaped tray. In this embodiment, a row of target devices 176 is aligned to be generally parallel to liner 110. Placement actuator 160 then places components 120 one at a time on each target device 176 in the row of devices, starting for example from the device 176 most distant from peel edge 134, or starting with target device 176 closest to peel edge 134. Such an embodiment may be particularly useful for a plurality of N target devices 176, disposed in a linear arrangement (1×N), but where the N target devices are not or cannot be moved until each of the target devices 176 in the row has a component 120 coupled thereto.

Alternatively, a plurality of target devices 176 are disposed in a two dimensional matrix, such as Y rows of N devices 176 (Y×N). In this embodiment, a tray of devices 176 is positioned relative to transfer device 600, and placement actuator 160 places components 120 on N devices 176 in a particular row. This is accomplished as noted above, by stopping placement actuator 160 at various positions along belt drive 620 corresponding to the various target devices 176 in the row. The tray of devices 176 may then be moved, to align a second row of devices 176 with placement actuator 160. The operation of placement actuator 160 is repeated for the second through Y row.

Additional embodiments of the present invention also exist, to provide greater flexibility for a variety of industries. For example, while device 100 is described with a single vacuum head 162, a greater number of vacuum heads may be used within the scope of the present invention. For example, a series of spaced vacuum heads may be used to retain larger components. In a particular embodiment, components retained by vacuum heads 162 may exceed eight inches, ten inches, or twelve inches in length. The vacuum heads 162 may be coupled to a single placement actuator 160 for coordinated movement, or to multiple placement actuators. In this manner, the present invention is extendible to multiple industries, and may involve the placement of larger components.

Notwithstanding the above description, it should be recognized that many other systems, functions, methods and combinations thereof are possible in accordance with the present invention. Thus, although the invention is described with reference to specific embodiments and figures, the embodiments and figures are merely illustrative, and not limiting of the invention. Rather, the scope of the present invention is to be determined by the appended claims.

What is claimed is:

1. A component transfer device, comprising:

a roller device adapted for moving a liner having a plurality of components removably adhered thereto;

a gripper adapted for selectively gripping the liner;

a placement actuator adapted for engaging a desired component of the plurality of components, the placement actuator further adapted for placing the desired component on a target device;

at least one stop, the stop positioned to engage the placement actuator at a desired location relative to the target device; and wherein the gripper and placement actuator are removably coupled with a coupler, the coupler adapted for moving the placement actuator when the roller device moves the liner.

2. The component transfer device as in claim 1 wherein the gripper and placement actuator move about a same linear distance when the roller device moves the liner.

3. The component transfer device as in claim 1 further comprising a base against which the liner is gripped by the gripper, the base comprising a peel edge over which the liner is moved.

4. The component transfer device as in claim 3 wherein the peel edge is a fixed peel edge.

5. The component transfer device as in claim 3 wherein the roller device comprises a pinch roller, and wherein the base is disposed between the pinch roller and the gripper.

6. The component transfer device as in claim 1 further comprising a tension device adapted to provide a back pressure generally resistive to the roller device moving the liner.

7. The component transfer device as in claim 1 wherein the placement actuator comprises a vacuum head for engaging the desired component.

8. The component transfer device as in claim 7 wherein the vacuum head comprises a hole pattern having a same general shape as the desired component.

9. The component transfer device as in claim 1 further comprising a sensor adapted for sensing a position of the desired component on the liner.

10. The component transfer device as in claim 9 wherein the sensor is further adapted for sensing a position on the liner of a next component to be transferred.

11. The component transfer device as in claim 9 further comprising a gas jet adapted for directing a gas towards the liner to bias the liner towards a base when the sensor is sensing the position of the desired component.

12. The component transfer device as in claim 1 wherein the liner comprises a release liner for removably adhering the plurality of components thereto.

13. The component transfer device as in claim 1 wherein at least some of the plurality of components are adhesive components removably adhered to the liner.

14. The component transfer device as in claim 1 wherein the placement actuator is adapted to engage the desired component while the desired component is adhered to the liner.

15. The component transfer device as in claim 1 wherein the actuator is adapted to retain the desired component when the liner is moved over a peel edge.

16. The component transfer device as in claim 1 wherein the actuator is adapted to rotate the desired component before placing the desired component on the target device.

17. The component transfer device as in claim 1 further comprising a print head adapted to print on the desired component when the desired component is on the liner.

18. The component transfer device as in claim 1 further comprising a controller coupled to the roller device for controlling the liner movement.

19. The component transfer device as in claim 18 wherein the controller is further coupled to the gripper.

20. The component transfer device as in claim 1 further comprising a stroke actuator coupled to the placement actuator and adapted for positioning the placement actuator relative to the target device.

21. The component transfer device as in claim 1 wherein the gripper and placement actuator are fixedly coupled together.

22. A component transfer device comprising:

means for moving a liner over a peel edge, the liner having a plurality of components removably adhered thereto;

a placement device adapted for engaging a first component of the plurality of components while the first component is adhered to the liner at a first location, the placement device further adapted for placing the first component on a target device;

at least one stop, the stop positioned to engage the placement device at a desired location relative to the target device; and a gripper adapted for gripping the liner at a second location;

wherein the gripper and placement device are adapted for moving about a same linear distance when the liner is moved.

23. The component transfer device as in claim 22 wherein the placement device is adapted to retain the first component when the first location passes over the peel edge separating the first component from the liner, the retained first component having a same general shape both before and after removal from the liner.

24. The component transfer device as in claim 22 further comprising a sensor adapted to sense a position of a second component on the liner.

25. The component transfer device as in claim 22 wherein the placement device is further adapted to place the first component on a target.

26. A method of transferring components from a liner to a desired target, the method comprising:

positioning the liner at a desired position;

engaging the liner with a gripper and with a placement actuator, the placement actuator engaging a desired component that is removably adhered to a first portion of the liner;

moving the liner so the first portion passes over a peel edge, wherein the gripper and the placement actuator move with the liner;

retaining the desired component with the placement actuator and removing the desired component from the liner when the first portion passes over the peel edge;

providing relative movement between the placement actuator retaining the desired component and the desired target, to couple the desired component and the desired target; and engaging the placement actuator at a desired location relative to the desired target with at least one stop.

27. The method as in claim 26 wherein the desired component remains substantially free of deformations when retained by the placement actuator compared to the desired component shape when adhered to the liner.

28. The method as in claim 26 wherein retaining the desired component with the placement actuator comprises applying a negative pressure to the desired component using a plurality of vacuum holes in the placement actuator.

29. The method as in claim 26 wherein providing the relative movement comprises a movement of the placement actuator.

30. The method as in claim 26 wherein providing the relative movement comprises a movement of the target device.

31. The method as in claim 26 further comprising sensing a location of the desired component on the liner before engaging the desired component with the placement actuator.

32. The method as in claim 31 further comprising directing a gas towards the liner to help hold the liner first portion substantially flat relative to the sensor when sensing the location of the desired component.

33. The method as in claim 26 further comprising controlling a second movement of the placement actuator to align the retained desired component and the desired target.

34. The method as in claim 26 further comprising retaining a second desired target with the placement actuator, and coupling the second desired target to the desired component while the desired component is adhered to the liner.

35. The method as in 34 further comprising coupling the desired component to the desired target after coupling the second desired target to the desired component.

36. The method as in claim 26 further comprising printing on the desired component while the desired component is adhered to the liner.

37. The method as in claim 26 wherein the gripper and the placement actuator move about a same linear distance when the liner is moved.

38. The component transfer device as in claim 1 further comprising a controller coupled with the gripper and the placement actuator, the controller configured to move the gripper and the placement actuator a linear distance in response to movement of the liner.

39. The component transfer device as in claim 22 further comprising a controller coupled with the gripper and the placement actuator, the controller configured to move the gripper and the placement actuator a linear distance in response to movement of the liner.

40. The method as in claim 26 wherein the gripper and the placement actuator move a linear distance in response to movement of the liner.

* * * * *